J. BECKER.
SPHEROMETER.
APPLICATION FILED DEC. 30, 1910.

1,093,307.

Patented Apr. 14, 1914.

Witnesses

Inventor
Joseph Becker

UNITED STATES PATENT OFFICE.

JOSEPH BECKER, OF WASHINGTON, DISTRICT OF COLUMBIA.

SPHEROMETER.

1,093,307.   Specification of Letters Patent.   Patented Apr. 14, 1914.

Application filed December 30, 1910. Serial No. 600,003.

*To all whom it may concern:*

Be it known that I, JOSEPH BECKER, a citizen of the United States, residing at Washington, in the District of Columbia, have invented new and useful Improvements in Spherometers, of which the following is a specification.

My invention relates to spherometers of the type having generally three rigidly connected points adapted to be rested on the spherical surface to be measured, while a fourth adjustable point is brought into contact with the spherical surface to yield a measure which according to well established rules permits of deducting or calculating the radius of curvature.

In strict theory the four contacting points of a spherometer should be without dimension, that is, should be purely geometrical points, but this is not possible in practice and hence there must always be present certain errors due to the unavoidable imperfections of the points.

The object of my invention is to avoid this difficulty without complicating the comparatively simple standard spherometer formula, and to this end my invention consists in providing each needle point of the ideally perfect spherometer with a perfect concentric sphere of any desired radius, but such that all spheres simultaneously used on the same instrument shall be of the same radius. In speaking of any needle point and its corresponding sphere as "concentric" I mean that the sphere is formed or mounted so as to have its geometrical center coincident with such needle point. By this means the spherometer proper has its points of virtual contact located at the geometrical centers of the four spherical feet, and these ideally perfect points of contact never can come into contact with the real surface to be measured, but only with the imaginary spherical surface that lies parallel to the real surface at a distance therefrom exactly equal to the common radius of the four spherical feet.

My invention is directly applicable to the simplified three point spherometer of the common type used by opticians in measuring the dioptric power of eye glasses, but as such devices are generally incapable of yielding the precise results aimed at by my improvements I shall illustrate my invention as applied to the standard four point spherometer.

Figure 1:
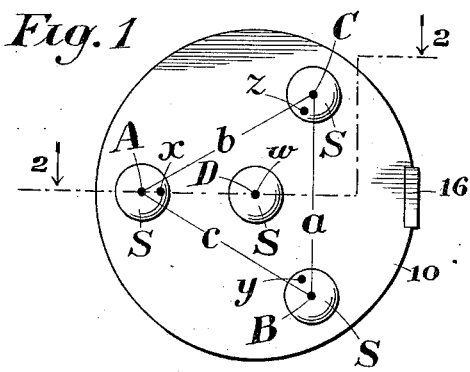
Figure 3:
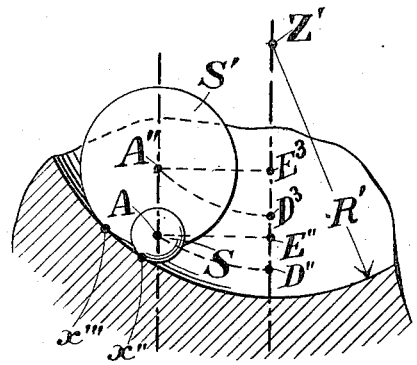
Figure 2:
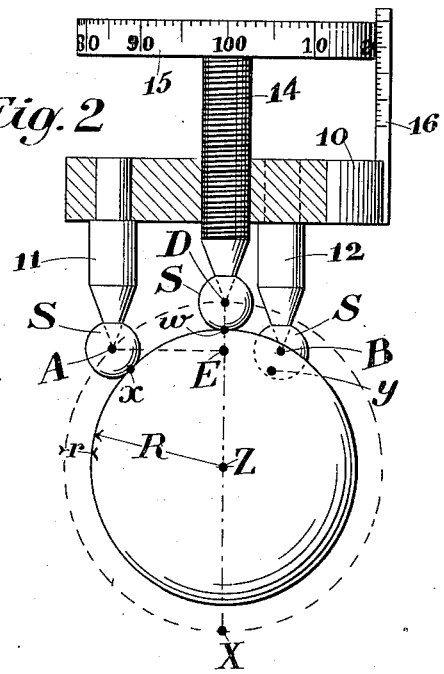
Figure 4:
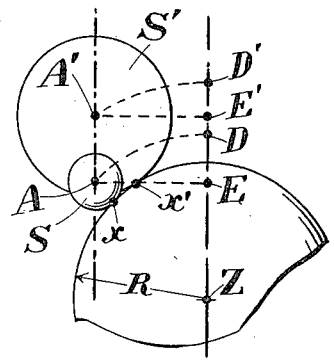

In the accompanying drawings, where similar reference signs refer to similar parts: Figure 1 is an inverted plan of one of the simplest forms of my invention; and Fig. 2 is an axial section on line 2 of Fig. 1, but showing, in addition, a sphere in contact with the four legs as it must be when the measurement is taken. Figs. 3 and 4 are diagrams to show that the theoretical basic triangle of the instrument is not changed by changing the size of the contact spheres.

The spherometer comprises a table 10 mounted on three rigid and preferably equidistant legs 11, 12, 13, of which 13 is concealed in Fig. 1 and not present in Fig. 2. The fourth or adjustable leg 14 is threaded to screw up and down through table 10, and is provided with a large graduated head 15, the revolutions of which are measured by the aid of the side scale 16 which is firmly fastened to table 10. The screw 14 is preferably made with a pitch of 1 mm. and its complete revolutions are counted on scale 16, which is also in millimeters for this purpose. Fractions of a turn are measured by the scale on head 15 which is preferably divided into 100 equal parts, as indicated in Fig. 2. So far the instrument presents nothing radically new except a heavier construction than usual, this being permissible because of the ample support afforded by the spherical feet in which the essence of the invention resides. In accordance with my invention, therefore, the four feet 11, 12, 13 and 14 are provided with perfect spheres S, S, S, S, all four being of the same but any desired radius $r$, and having their centers exactly coincident with the imaginary and hence geometrically perfect points A, B, C, D of the feet. In the drawings all geometrical points are indicated by heavy black dots for clearness.

Let R (Fig. 2) be the radius to be measured, then $(R+r)$ will be the radius of the sphere determined by the four geometrical points A, B, C, D. Drawing AE (Fig. 2) perpendicular to DX we have by a known theorem:

$$\overline{AD}^2 = \overline{DE} \times \overline{DX}$$

whence—

$$DX = \frac{\overline{AD}^2}{\overline{DE}} = \frac{\overline{AE}^2 + \overline{DE}^2}{\overline{DE}} = 2(R+r)$$

or—

$$(R+r) = \frac{1}{2}\left(\frac{\overline{AE}^2}{\overline{DE}} + \overline{DE}\right) \quad (1)$$

in which $r$ is always positive, regardless of the sign of R; $\overline{AE}^2$ is a constant equal to $\frac{1}{3}\overline{AB}^2$ (if the basic triangle ABC be, as usual, equilateral) and DE is the measurement given by the micrometer 14, 15, 16.

Formula (1) is substantially identical with the standard spherometer formula which will be found given on page 11 of "*A Laboratory Course in Experimental Physics*," by Loudon and McLennan, New York and London, 1895.

In Fig. 1 points $x$, $y$, $z$ and $w$ being the points of contact with the spherical surface to be measured, triangle $xyz$ will be seen to be variable in size, according to the size and sign of R. It is identical with ABC for a plane surface; smaller than ABC, as in Figs. 2 and 3, for convex surfaces; and larger than ABC for concave surfaces, as seen in Fig. 3. The different positions of $x$ in Figs. 4 and 3 are distinguished as $x$, $x'$, $x''$, $x'''$. The triangle $xyz$, therefore, is very variable, but the triangle ABC, which alone enters into the preceding computation, remains absolutely invariable, and this is the feature that substantially preserves the standard spherometer formula, in which $\overline{AE}^2$, the sole constant of the instrument, is easily derived from the value of AB=BC=CA. One of the principal advantages of my instrument is that these distances AB, BC, CA, between centers A, B and C, are very easily measured by calipering the inside shortest distance (Fig. 1) between spheres and adding $2r$, or else by calipering the outside longest distance and subtracting $2r$, or again it may be found by taking the average of these two caliperings.

If the three distances turn out to be slightly unequal so that we have, say,

AB=$c$, BC=$a$, CA=$b$, then their average or $$\frac{1}{3}(a+b+c)$$

may without committing any great error be used for AB in calculating the value of $\overline{AE}^2$; that is is to say, $$\overline{AE}^2 = \frac{1}{27}(a+b+c)^2 \quad (2)$$

which becomes $\frac{1}{3}a^2$, as before stated, when $a=b=c$.

Although my spherometer should preferably be made with the basic triangle ABC exactly or very nearly equilateral as in all spherometers heretofore made or proposed, the precision with which the three distances $a$, $b$, $c$ can be fixed and measured in my instrument does away with any necessity for satisfying this condition. In my instrument, therefore, the three distances $a$, $b$, $c$ may be very unequal so that the triangle shall be decidedly scalene and the only condition to be satisfied is that the three points A, B, C shall all be equally distant from the axis of screw 14, so that point E shall be the center of the circle circumscribed to the triangle ABC, which may (at least for theoretical purposes) be so irregular as to lie entirely to one side of such center.

The exact value of $\overline{AE}^2 = \overline{BE}^2 = \overline{CE}^2$ is given by the general formula $$\overline{AE}^2 = \frac{a^2 b^2 c^2}{(a+b+c)(-a+b+c)(a-b+c)(a+b-c)} \quad (3)$$

in which the first factor of the denominator is the total periphery of the triangle and the three following factors are the three differences obtained by subtracting each side in turn from the sum of the other two sides.

Although there is no doubt that the sphere actually measured has a radius (R+$r$), it would be a mistake to assume that, for a given value of R, the measure DE is a constant independent of $r$. According to equation (1) the value of DE may be expressed by $$DE = (R+r) \pm \sqrt{(R+r)^2 - \overline{AE}^2}$$

in which AE is a constant. DE, therefore, varies not only with R, but also with $r$, even if R be supposed constant. This is illustrated in Figs. 3 and 4, which are diagrams illustrating the effects produced by substituting a larger ball foot S' for the foot S shown in Figs. 1 and 2. The effects differ according to whether the surface to be measured is concave, as in Fig. 3, or convex, as in Fig. 4. In both cases, and in general, the basic triangle ABC, as already explained, remains invariable, but is lifted into a concentric sphere. On the convex surface, Fig. 4, the lift is from A to A' into a sphere of less curvature which reduces the reading from DE to D'E'; and on a concave surface, Fig. 3, the lift is from A to A'' into a sphere of greater curvature which increases the reading from D''E'' to D³E³. Moreover, in Fig. 4 the point of contact $x$ is shifted to $x'$, and in Fig. 3 the different point of contact $x''$ is shifted to $x'''$. While contact points $x$, $y$, $z$ as thus seen vary in position, with any variation in R or $r$, contact point $w$ of the central screw 14 remains central and, therefore, screw 14 does not need a spherical termination at all except to permit of measuring concave surfaces and in this case any rounded end will answer. The spheres on points A, B, C are, therefore, all that the theory of my invention requires, and these three are best made not as attachments for already pointed feet, but by turning each leg and its sphere out of the solid metal. Should the three spheres used turn out to be slightly unequal, say with radii $r'$, $r''$, $r'''$, then their average $\frac{1}{3}(r'+r''+r''')$ should be used for the value of $r$.

While I have shown a micrometer screw 14 for measuring the displacements of the movable point D, it will be understood that any other suitable measuring means may be used instead, as my invention is entirely independent of such measuring means.

The principal advantages of my invention are: First. Absolute theoretical accuracy, due to absolute invariability of the basic triangle ABC, and facility of measuring the same. Second. Solidity of construction, desirable in itself and as insuring accuracy. Third. Provision of almost flat contact surfaces that will not mar or injure the work, and that will not yield.

The facility of measuring the basic triangle ABC is especially valuable in spherometers of the Perreaux type, in which the three feet are radially adjustable to change the size of the basic triangle as set forth in vol. 49 of the "*Bulletin de la Société d'Encouragement*," Paris, 1850 (pp. 145, 146; Figs. 1, 2, 3 of Plate 1136).

By referring to an article of Czapski in the *Zeitschrift für Instrumentenkunde*, year 1887, pp. 297 to 301, it will be seen that my invention effectively avoids all objections that can be made to the common needle point spherometer as well as to the Bamberg knife edge spherometer shown in Czapski's Fig. 3, and that it can be used in combination with a "well," as will be obvious on inspection of Czapski's Fig. 1, for measuring the curvature of small lenses. The different uses of the "well" are fully explained in an article by Alfred M. Mayer in the *American Journal of Science* for July, 1886, third series, Vol. XXXII, pp. 61 to 69.

According to Winkelmann, "*Handbuch der Physik*," vol. 1, Leipzig, 1908, page 100, Zeiss, of Jena, constructs a very accurate spherometer having a ring with an inner circular knife edge for convex surfaces, and an outer circular knife edge for concave surfaces. An objection to this Zeiss ring, however, is that it provides for a continuous and perfectly circular line of contact, and that this condition can only be satisfied when the surface whose radius of curvature is to be measured is a perfect sphere. The tripod spherometer, on the other hand, can always rest solidly on the most irregular surface, and may, indeed, be used for detecting such irregularity.

The practical value and importance of the present invention will appear on reference to the *Comptes Rendus*, Paris, 1911, tome 152, pp. 421–423 (also erratum on page 648 of the same volume), where a description is given of substantially the same ball foot spherometer as independently invented by Nugues, who uses accurately made ball bearing balls for the feet. This Nugues spherometer is again referred to in the *Zeitschrift für Instrumentenkunde*, Berlin, 1911, p. 203.

What I claim as my invention and desire to secure by Letters Patent is:

1. A spherometer having rigidly connected contact members composed of relatively large rigid spheres of the same radius, arranged so that the geometrical centers of such spheres shall correspond to the ideal geometrical needle points of the instrument.

2. A spherometer of the tripod type, having three rigidly connected feet or contact members composed of relatively large rigid spheres of the same radius, arranged so that the geometrical centers of such spheres shall correspond to the three ideal geometrical needle points of the instrument.

In testimony whereof, I have signed my name to this specification in the presence of two subscribing witnesses.

JOSEPH BECKER.

Witnesses:
MARY E. POWELL,
W. E. WRIGHT.

---

Copies of this patent may be obtained for five cents each, by addressing the "Commissioner of Patents, Washington, D. C."